(12) United States Patent
Nadabar

(10) Patent No.: US 7,984,854 B2
(45) Date of Patent: Jul. 26, 2011

(54) METHOD AND APPARATUS FOR MULTIPLEXED SYMBOL DECODING

(75) Inventor: Sateesha Nadabar, Framingham, MA (US)

(73) Assignee: Cognex Corporation, Natick, MA (US)

( * ) Notice: Subject to any disclaimer, the term of this patent is extended or adjusted under 35 U.S.C. 154(b) by 226 days.

(21) Appl. No.: 11/457,968

(22) Filed: Jul. 17, 2006

(65) Prior Publication Data

US 2008/0011855 A1 Jan. 17, 2008

(51) Int. Cl.
*G06K 7/10* (2006.01)

(52) U.S. Cl. .......... 235/462.07; 235/462.01; 235/462.11

(58) Field of Classification Search ............. 235/462.07, 235/462.1, 462.11, 462.41

See application file for complete search history.

(56) References Cited

U.S. PATENT DOCUMENTS

| | | | |
|---|---|---|---|
| 4,408,344 A | 10/1983 | McWaters | |
| 4,542,548 A | 9/1985 | Marazzini | |
| 4,782,220 A | 11/1988 | Shuren | |
| 5,053,609 A | 10/1991 | Priddy et al. | |
| 5,198,650 A * | 3/1993 | Wike, Jr. | 235/462.45 |
| 5,262,626 A | 11/1993 | Goren et al. | |
| 5,286,960 A | 2/1994 | Longacre et al. | |
| 5,304,787 A | 4/1994 | Wang | |
| 5,412,197 A | 5/1995 | Smith | |
| 5,420,409 A | 5/1995 | Longacre et al. | |
| 5,428,212 A | 6/1995 | Tani et al. | |
| 5,463,214 A | 10/1995 | Longacre, Jr. et al. | |
| 5,481,098 A | 1/1996 | Davis et al. | |
| 5,510,603 A * | 4/1996 | Hess et al. | 235/454 |
| 5,627,358 A * | 5/1997 | Roustaei | 235/462.11 |
| 5,657,402 A | 8/1997 | Bender et al. | |
| 5,739,518 A | 4/1998 | Wang | |
| 5,742,037 A | 4/1998 | Scola et al. | |
| 5,780,834 A * | 7/1998 | Havens et al. | 235/462.1 |
| 5,825,006 A | 10/1998 | Longacre, Jr. et al. | |
| 5,872,354 A | 2/1999 | Hanson | |
| 5,914,476 A | 6/1999 | Gerst, III et al. | |
| 5,929,418 A | 7/1999 | Ehrhart et al. | |
| 5,932,862 A | 8/1999 | Hussey et al. | |
| 5,992,744 A * | 11/1999 | Smith et al. | 235/462.11 |
| 6,006,990 A | 12/1999 | Ye et al. | |
| 6,075,905 A | 6/2000 | Herman et al. | |
| 6,078,251 A | 6/2000 | Landt et al. | |
| 6,095,422 A | 8/2000 | Ogami | |
| 6,141,033 A | 10/2000 | Michael et al. | |

(Continued)

FOREIGN PATENT DOCUMENTS

DE 10012715 9/2000

(Continued)

OTHER PUBLICATIONS

Taniguchi, R-I, et al., "A Distributed-Memory Multi-Thread Multiprocessor Architecture for Computer Vision and Image Processing: Optimized Version of AMP," System Sciences, 1993, Los Alamitos, CA, pp. 151-160.

(Continued)

*Primary Examiner* — Ahshik Kim

(57) ABSTRACT

A method and apparatus for multi-threaded operation of an image-based symbology reader is provided. In the method of the invention, acquired images of an encoded symbol are attempted to be decoded using a plurality of decoding engines asynchronously and substantially simultaneously in a multi-threaded processing environment. Each of the decoding engines can be directed to a specific symbology type to achieve an improved response time when reading multiple symbol types.

37 Claims, 2 Drawing Sheets

U.S. PATENT DOCUMENTS

| | | | |
|---|---|---|---|
| 6,158,661 | A | 12/2000 | Chadima, Jr. et al. |
| 6,161,760 | A | 12/2000 | Marrs |
| 6,250,551 | B1 | 6/2001 | He et al. |
| 6,298,176 | B2 | 10/2001 | Longacre et al. |
| 6,334,060 | B1 | 12/2001 | Sham et al. |
| 6,405,925 | B2 | 6/2002 | He et al. |
| 6,408,429 | B1 | 6/2002 | Marrion et al. |
| 6,446,868 | B1 | 9/2002 | Robertson et al. |
| 6,491,223 | B1 | 12/2002 | Longacre, Jr. et al. |
| 6,512,714 | B2 | 1/2003 | Hanzawa et al. |
| 6,629,642 | B1 | 10/2003 | Swartz et al. |
| 6,677,852 | B1 | 1/2004 | Landt |
| 6,681,151 | B1 | 1/2004 | Weinzimmer et al. |
| 6,698,656 | B2 | 3/2004 | Parker et al. |
| 6,728,419 | B1 | 4/2004 | Young |
| 6,761,316 | B2 | 7/2004 | Bridgelall |
| 6,786,414 | B2 | 7/2004 | Francis |
| 6,816,063 | B2 | 11/2004 | Kubler |
| 6,919,793 | B2 | 7/2005 | Heinrich |
| 7,044,378 | B2 | 5/2006 | Patel et al. |
| 7,059,525 | B2 | 6/2006 | Longacre, Jr. et al. |
| 7,061,524 | B2 | 6/2006 | Liu et al. |
| 7,066,388 | B2 | 6/2006 | He |
| 7,070,099 | B2 | 7/2006 | Patel |
| 7,175,090 | B2 | 2/2007 | Nadabar |
| 7,181,066 | B1 | 2/2007 | Wagman |
| 7,604,174 | B2 | 10/2009 | Gerst et al. |
| 2001/0042065 | A1 | 11/2001 | Sasaki et al. |
| 2001/0042789 | A1 | 11/2001 | Krichever et al. |
| 2003/0062418 | A1 | 4/2003 | Barber et al. |
| 2003/0195749 | A1* | 10/2003 | Schuller .................. 704/258 |
| 2003/0201328 | A1 | 10/2003 | Jam et al. |
| 2005/0275831 | A1 | 12/2005 | Silver |
| 2006/0022052 | A1 | 2/2006 | Patel et al. |
| 2006/0131418 | A1 | 6/2006 | Testa |
| 2006/0131419 | A1 | 6/2006 | Nunnink |
| 2006/0133757 | A1 | 6/2006 | Nunnink |
| 2006/0283952 | A1 | 10/2006 | Wang |
| 2006/0249581 | A1 | 11/2006 | Smith et al. |
| 2007/0181692 | A1 | 8/2007 | Barkan et al. |
| 2008/0004822 | A1 | 1/2008 | Nadabar et al. |
| 2008/0011855 | A1 | 1/2008 | Nadabar |
| 2008/0019615 | A1 | 1/2008 | Schnee et al. |
| 2009/0121027 | A1 | 5/2009 | Nadabar |

FOREIGN PATENT DOCUMENTS

| | | |
|---|---|---|
| EP | 0571892 A | 12/1993 |
| EP | 0896290 | 10/2004 |
| EP | 1469420 | 10/2004 |
| EP | 1975849 | 1/2008 |
| WO | 0215120 | 2/2002 |
| WO | 02075637 | 9/2002 |
| WO | 03102859 | 12/2003 |
| WO | 2008118419 | 10/2008 |
| WO | 2008118425 | 10/2008 |

OTHER PUBLICATIONS

Wittenburg, J.P., et al., "A Multithreaded Architecture Approach to Parallel DSPs for High Performance Image Processing Applications," Signal Processing Systems, Piscataway, NJ, 1999, pp. 241-250.

Office action dated Mar. 17, 2010, European Patent application No. 07812962.4.

Response to Office action, dated Jul. 23, 2010, European Patent application No. 07812962.4.

Cognex Technology and Investment, International Preliminary Report on Patentability Chapter I (IB/373), PCT/US2007/073575, Publication Date Jan. 20, 2009.

Cognex Technology and Investment, Written Opinion of the International Search Authority, PCT/US2007/073575, Publication Date Jan. 17, 2009.

* cited by examiner

METHOD AND APPARATUS FOR MULTIPLEXED SYMBOL DECODING

BACKGROUND OF THE INVENTION

1. Field of the Invention

The present invention relates to a method and apparatus for multiplexed decoding of bar codes and symbols using a hand-held symbology reader.

2. Description of the Related Art

Bar codes are linear symbols that encode textual strings or data that are used in industrial applications to identify parts or components and/or characteristics and features of the parts or components upon which they are applied. In an application that employs the use of a bar code symbol, a device is used to "read" the bar code and decode the encoded data. In applications like part tracking and warehouse operations, the act of reading a bar code is a means for data entry that is fast, consistent, and reliable.

Two-dimensional symbols have been developed as an extension to linear bar codes to provide a high density symbol with capabilities to encode significantly more information. For example, the Data Matrix symbol is a commonly-known two dimensional symbol that encodes data within a matrix of cells that occupy a two-dimensional grid. Two-dimensional codes are also referred to as stacked or matrix codes.

Reading devices have been developed to read one-dimensional bar codes that have been optimized for extremely fast response times. These readers are typically laser scanning systems that project a laser illumination onto the targeted bar code symbol to produce a reflectance waveform that is detected and rapidly analyzed by the reading device. These systems, however, are not easily adapted to reading symbols that have data encoded in more than one dimension.

Image-based readers have been developed to read two-dimensional symbols. In these image-based systems, an acquired image is processed and analyzed using machine vision algorithms to find the symbol in the image, and through the implementation of symbol decoding algorithms, the symbol is decoded.

While laser scanning one-dimensional bar code readers are not suitable for reading two-dimensional codes, image based two-dimensional readers are quite adaptable for decoding both one-dimensional bar codes and two-dimensional symbols. An image-based reader configured to read a one-dimensional code can locate and decode a bar code with a response time that is substantially similar to a laser-scanning reader. However, when an image-based reader is configured to perform autodiscrimination (automatically determine if either a one-dimensional symbol or a two-dimensional symbol is being read), the effective response time can be drastically and unacceptably increased.

BRIEF SUMMARY OF THE INVENTION

The present invention relates to a method and apparatus for multiplexed symbol decoding by attempting to decode an encoded symbol using a plurality of decoding processes in a multiplexed processing environment—i.e., by attempting to decode using a plurality of decoding processes that are executed asynchronously and substantially simultaneously. In this method, a decode attempt of either of a one-dimensional symbol and a two-dimensional symbol will attain a successful decoded result, on average, faster than a sequential application of a decoding attempt using each of a respective decoding engine.

In one embodiment, the method of the present invention attempts to decode an encoded symbol using a first decoding thread while asynchronously and substantially simultaneously attempting to decode the encoded symbol using a second decoding thread. Once decoded by any of the decoding threads, the method reports a result, i.e., the decoded string.

In another embodiment, the method of the present invention performs the asynchronous and simultaneous decoding attempt using a plurality of decoding threads, while continuously acquiring images of the encoded symbol. Once any one of the plurality of decoding threads exceeds a timeout limit of a predetermined value, the decoding thread repeats using the current image from the continuously acquired images.

An apparatus according to the present invention has an imaging module with an image sensor and a lens that provides an image of a field of view. The apparatus has a data bus coupled to the imaging module, and a memory module and processor coupled to the data bus. The processor has an acquisition process that controls the imaging module and the memory module to transfer the image into the memory module via the data bus, and a plurality of decoding thread processes that attempt to decode a symbol in the image. The plurality of decoding processes operate substantially simultaneously and asynchronously to implement the method of the present invention.

Other aspects of the invention, in addition to those described above, will be apparent to one of ordinary skill in the art from the description of the invention that follows. In the description, reference is made to the accompanying drawings, that form a part hereof, and that illustrate examples of the invention.

BRIEF DESCRIPTION OF THE SEVERAL VIEWS OF THE DRAWINGS

The invention will be more fully understood from the following detailed description, in conjunction with the following figures wherein.

DETAILED DESCRIPTION OF THE INVENTION

Figure 1:
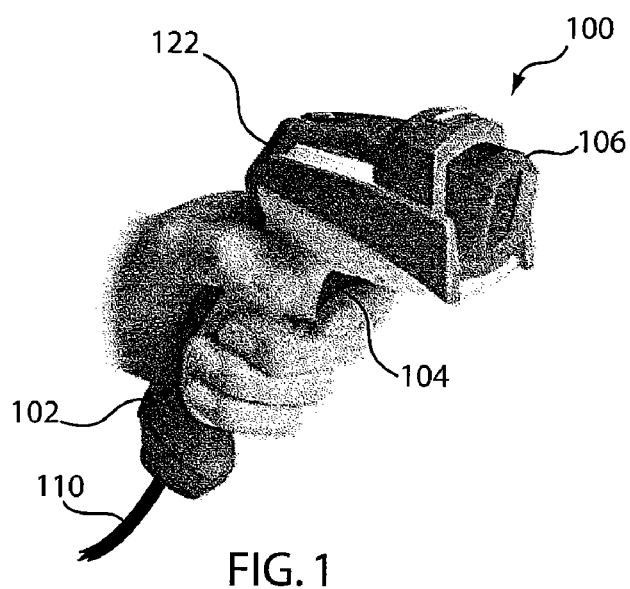
FIG. 1 depicts a hand-held image-based reader according to the present invention.

An embodiment of a hand-held image-based reader according to the present invention is shown in FIG. 1. The hand-held reader 100 has a housing 122 with a grip portion 102 and a trigger 104 that can be actuated by a finger of the user to initiate the image acquisition and decoding function. A tether cord 110 provides electrical power to the reader 100, as well as a communication transmission path for the decoded character string of the encoded information, though it is contemplated that the reader 100 can be configured with battery power and wireless communication for complete portable flexibility. Illumination is provided by LEDs from within and controlled by the reader that emit illumination through a light pipe 106.

Figure 2:
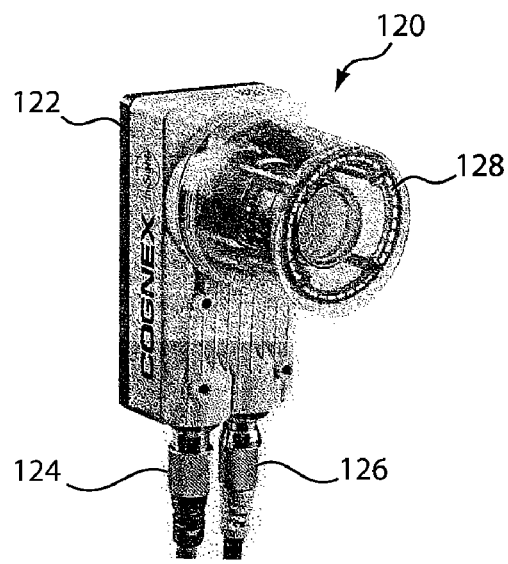
FIG. 2 depicts a fixed-mount image-based reader according to the present invention.

An embodiment of a fixed-mount image-based reader according to the present invention is shown in FIG. 2. The fixed mount reader 120 has a housing 122 with an electrical power cord 124 to provide a source for power, and a communications cord 126 to provide a communications transmission path for the decoded character string of the encoded information and signals to and from a host controller or ancillary equipment. LED illuminators 128 are shown to provide a source of illumination that can be controlled by the reader.

Figure 3:
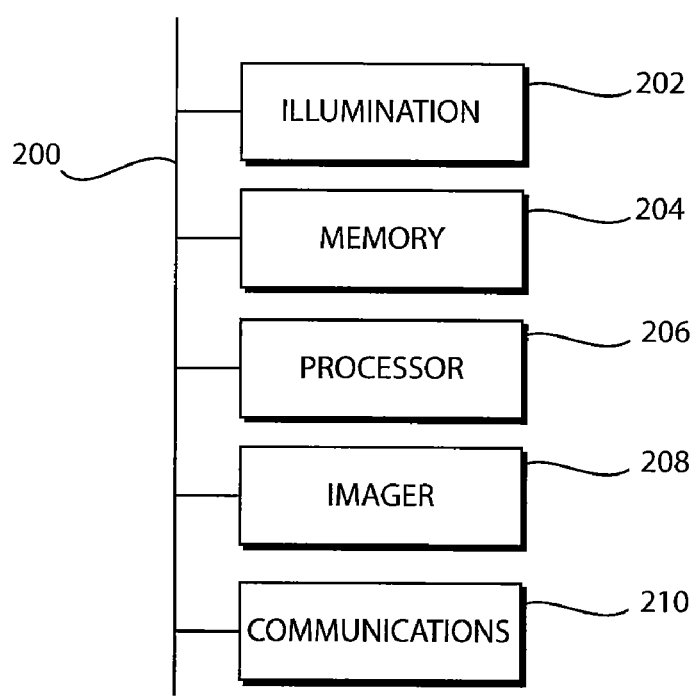
FIG. 3 is a schematic diagram of the functional components of an illustrative embodiment of the present invention.

FIG. 3 shows a schematic diagram of the functional components common to both the hand held reader 100 and the fixed mount reader 120 according to the present invention. An illumination module 202 provides illumination of the object upon which the bar code or symbol is marked. Various modes of illumination can be provided by selectively activating any one of a plurality of illumination elements within the illumination module 202. Optionally, illumination can be provided externally to the reader in a mode of operation that relies upon ambient illumination.

An imaging module 208 includes an imaging sensor, such as a CMOS or CCD sensor, and optical elements, such as a lens assembly, that cooperatively operate to project a focused image of a field of view onto the imager. The imaging module 208 provides an image, that is a digital representation of the field of view, that may contain the component or label upon which the bar code or symbol is marked. In an illustrative embodiment of the hand held reader 100 or the fixed mount reader 120, a global shutter CMOS wide VGA, having a pixel array of 752×480 pixels is used for the image sensor.

A processor module 204 includes a microprocessor and associated components and circuitry to control various aspects of the reader. The processor module 204 can include a digital signal processor such as the DM642 digital signal processor available from Texas Instruments. The processor module 204 can include a multi-core processor or a plurality of processors that cooperatively inter-operate.

A memory module 206 includes a RAM (random access memory) for storing image data and a flash memory for storing an updateable control program. In the illustrative embodiment of either of the hand held reader 100 or the fixed mount reader 120, 32 MB of dynamic RAM is used, and 4 MB of flash memory is used. The memory module 206 works in cooperation with the processor module 204 so that the processor will execute a stored control program to carry out the operations described herein.

A communications module 210 provides the necessary interface functionality to access and exchange information to and from the reader. In one illustrative embodiment, the communications module will include a USB interface wherein either of the hand held reader 100 and the fixed mount reader 120 can interface directly with a host computer running an application that cooperates with the executing program running on the processor module 204. Other embodiments can employ an Ethernet interface, an RS-232 interface, or a wireless interface using Bluetooth or IEEE 802.11 standard. Additionally, visual and/or audible feedback can be provided to the user of a reader from the communications module by activating an audible beep, or by activating an LED indicator lamp, upon successful (or unsuccessful) decoding attempts. Further, the communications module can include I/O, including a trigger, either internal or external to the reader, that can initiate a decoding attempt.

An interface bus 200 is provided to interconnect each of the processor module 204, the memory module 206, the imaging module 208, the communications module 210, and optionally, the illumination module 202 to perform a reading process. An image of the field of view acquired by the imaging module 208 is transferred to the memory module 206 over the bus 200. The processor module 206 performs various analysis methods to locate the bar code or symbol in the image, and performs a decoding algorithm to decode the located bar code or symbol. Upon a successful decode, the communications module 210 is controlled by the processor module 206 over the bus 200 to report and transmit the decoded results. The illumination module 202 can be optionally controlled by the processor module 206 over the bus 200 by activating the illuminator module upon the initiation of the reading process, and deactivating the illumination module upon completion or termination of the reading process.

In conventional implementations according to the prior art, a reader is configured to read and decode one or a plurality of bar codes or symbols. A hand held reader is aimed at the bar code or symbol, and when activated by the trigger, a reading process is initiated. A fixed mount reader can be similarly configured and mounted in the general direction of an object bearing a bar code or symbol, for example on a conveyor or as presented by a user. The reading process of the fixed mount reader is initiated by an external trigger, or the it can be continuously executing the reading process. In either the hand held or fixed mount implementation, a successful decode of the bar code or symbol will result in the transmission of the decoded text contained and encoded by the bar code or symbol.

The method and apparatus of the present invention permits an improved reading response time when reading bar codes or symbols of various types. By attempting to decode more than one type of bar code or symbol at the same time, the average reading rate can be improved over the sequential application of several decoding methods. The advantages of the present invention can be particularly appreciated by those skilled in the art when applied to bar codes and symbols that are marked directly on the surface of the object, e.g., Direct Part Marking (DPM) methods. DPM symbols are typically more difficult to read successfully in comparison to symbols printed on labels or packaging. DPM methods require robust decoding algorithms, and the elapsed time to decode these marks are typically expected to be longer than a bar code printed on a label. When used in a mixed reading environment, the reader of the present invention provides substantially the same response time for DPM symbols, but also a rapid response time for easily-decoded bar codes or symbols.

As used herein, a process refers to systematic set of actions directed to some purpose, carried out by any suitable apparatus, including but not limited to a mechanism, device, component, software, or firmware, or any combination thereof that work together in one location or a variety of locations to carry out the intended actions.

In an illustrative embodiment, computer software instructions include those for carrying out actions described herein, for such functions as reading a symbol, image capture; image analysis; multi-threaded operation, memory buffer management, symbol decoding, and output signaling.

Furthermore, it will be understood by those skilled in the art that the above is a list of examples only. It is not exhaustive, and suitable computer software instructions may be used in illustrative embodiments to carry out any suitable process.

Figure 4:
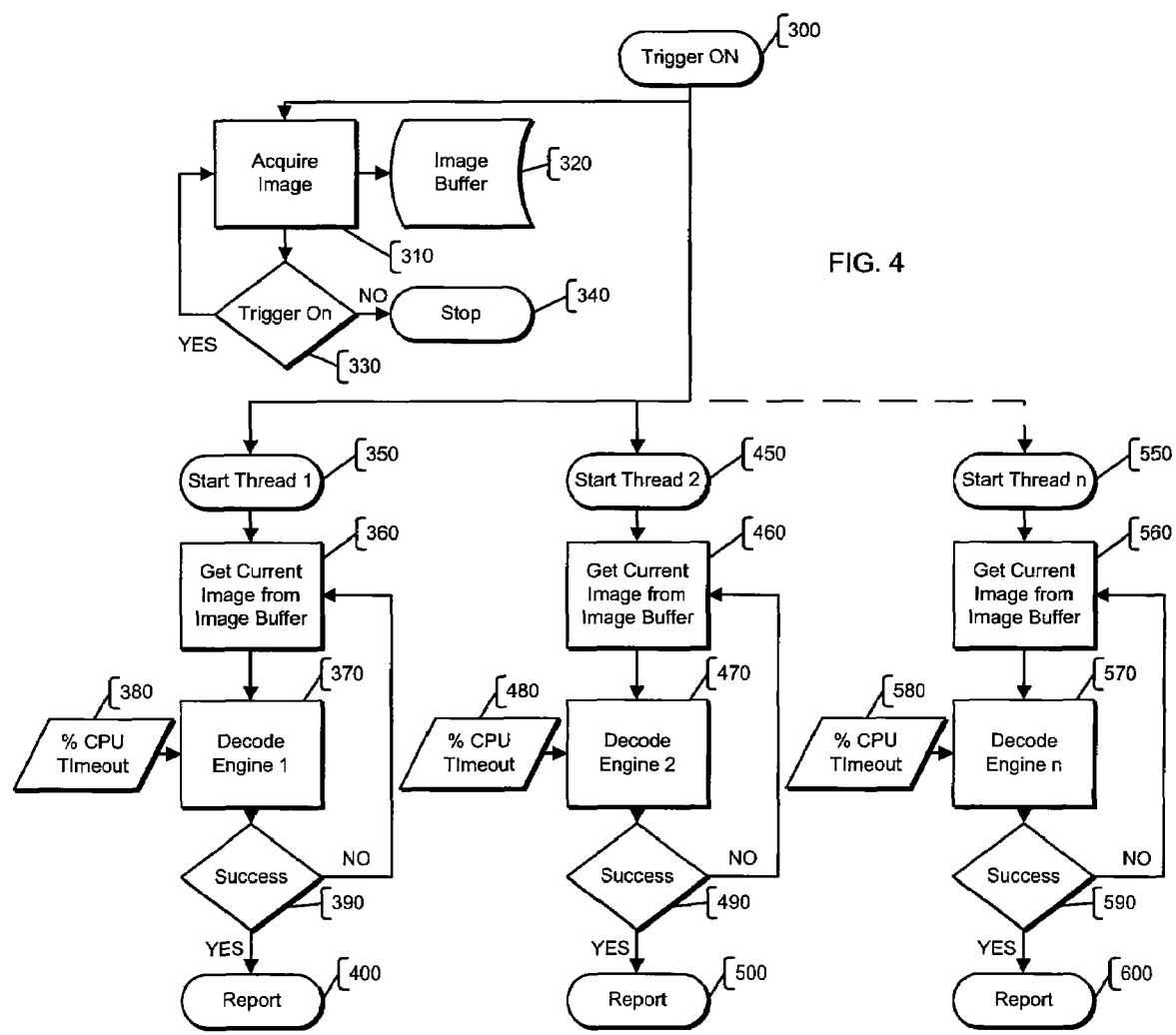
FIG. 4 is a flowchart of the method of the present invention.

Referring to FIG. 4, a flow chart of the method of the present invention is shown. In step 300, the reading process is initiated. The illustrative embodiment of the hand held reader 100 can implement this step 300 in response to the activation of the trigger 104 by the user. In this embodiment, the illumination module 202 may be activated to project illumination onto a target object upon which the reader 100 is aimed by the user. The illustrative embodiment of the fixed mount reader 120 can implement this step 300 upon command of a host controller or through an external trigger, through appropriate signals transmitted to the reader 120 over the communications cord 126.

Step 310 performs an image acquisition process, where the imaging module 208 exposes the sensor to reflected illumination from the field of view under appropriate control of the processor module 206. At step 320, the image sensor of the imaging module 208 transfers image data into the memory module 204 that is configured as an image buffer. The image buffer of step 320 is configured to hold n+2 image frames, or slots, where n is the number of decoding threads that are performed in a multi-thread processing environment. One image slot is reserved for active acquisition, one slot is reserved for the most recently acquired image (the current image), and the remaining n slots are use, if necessary, to allow the n decoding threads to operate independently on n separate images. The frame rate of acquisition in the exemplary embodiment is approximately 30 frames per second.

At step 330, the processor module 206 controlling the acquisition process at step 310 performs a test to determine if it must continue. In the illustrative embodiment of the hand held reader 100, the test at step 330 will cause a termination of the process at step 340 if a successful decode is performed, as described below, or if the trigger 104 is released. In the illustrative embodiment of the fixed mount reader 120, the test at step 330 will cause a termination of the process at step 340 if the appropriate signals from the host controller or ancillary equipment are received. In either embodiment, the test at step 330 will otherwise continue back to step 310 to acquire another image and transfer the image into the image buffer at step 320.

Step 350 initiates a first decoding thread that is performed by the processor module 206. At step 360, the current image is obtained from the image buffer of step 320. At step 370, a first decoding engine is operated on the image obtained at step 360, using the values of parameters 380 that are specified in a configuration session of the reader. The values of parameters 380 include a portion of the processing resources that the microprocessor of the processing module 206 are attributed to the first decoding engine 370, and a timeout upon which the decoding engine will terminate. Accordingly, the first decoding engine that operates at step 370 runs in a processing thread that shares the processor resources with the processor module with other threads that may be active in the processor. This sharing is accomplished by using the multithreading capabilities of the operating system running on the processor, for example, in the exemplary embodiment, a Texas Instruments DM642 digital signal processor is used.

The multithreading operates as follows. The processor resources are shared between various threads contending for the resource by dividing up processor time into small time units. In the exemplary embodiment, 5 millisecond time slices are used. After every 5 milliseconds, the current thread is stopped temporarily and control transferred to a task scheduler function. The task scheduler function keeps track of the number of time slices that each active thread has executed so far, and based on the values of percent of CPU time to be allocated for each thread, determines which thread should be schedule next for execution in order to maintain the ratio of percent of CPU time as the user requested. The decoding engine in step 370, also calculates the current real time, in approximately 1 millisecond intervals to determine if the maximum amount of time for the decoding engine has been exceeded.

Processing continues to step 390 upon termination of the first decoding engine operation at step 370. If the first decoding engine terminates without a successful decode result, processing jumps back to step 360, where the current image from the image buffer is obtained. This image will be a different image than the previously analyzed image if the acquisition period is greater than the timeout parameter. If the first decoding engine terminates with a successful decode result, processing continues to step 400 where the result of the first decoding engine operation is reported.

Step 450 initiates a second decoding thread that is performed by the processor module 206. At step 460, the current image is obtained from the image buffer of step 320. At step 470, a second decoding engine is operated on the image obtained at step 460, using the values of parameters 480 that are specified in a configuration session of the reader. The values of parameters 480 include a portion of the processing resources that the microprocessor of the processing module 206 are attributed to the second decoding engine 470, and a timeout upon which the decoding engine will terminate. Accordingly, the second decoding engine that operates at step 470 runs in a processing thread that shares the processor resources with the processor module with the first decoding engine at step 370.

Referring still to FIG. 4, an optional nth decoding thread is initiated at step 550 representing any number of simultaneous additional decoding threads that can be performed. At step 560, the current image is obtained from the image buffer of step 320. At step 570, an nth decoding engine is operated on the image obtained at step 560, using the values of parameters 580 that are specified in a configuration session of the reader. The values of parameters 580 include a portion of the processing resources that the microprocessor of the processing module 206 are attributed to the nth decoding engine 570, that are shared cooperatively with all other decoding threads, and a timeout upon which the decoding engine will terminate.

In an exemplary embodiment of the present invention, the reader is configured for decoding two types of encoded symbols. The first decoding engine is configured to decode a one-dimensional bar code, such as the "Code 128" symbol. This bar code symbology is an alphanumeric bar code that encodes ASCII characters, that is relatively easily located and decoded by an image-based reader. The second decoding engine is configured to decode a two-dimensional data matrix symbol. This two-dimensional symbology is a high density data encoding method that requires an image-based reader, and can be relatively challenging to locate and decode.

Referring still to FIG. 4, once the read process is initiated at step 300, the one-dimensional bar code decoding thread will initiate at step 350 substantially simultaneously as the initiation of the two-dimensional data matrix decoding thread at step 450. For simplicity in its explanation, the optional nth decoding thread is not enabled in the exemplary embodiment. Each of the respective threads will obtain a current image from the image buffer at step 360 and 460, though depending on the acquisition rate, the two threads may not necessarily operate on the same image.

Since the first decoding thread is configured for a relatively easy task of decoding the one-dimensional bar code, the parameters at step 380 in the exemplary embodiment are set to 17.6% of available processor resources, with a timeout of 85 milliseconds. For the second decoding thread, configured for a relatively more complex two-dimensional symbol, the parameters at step 480 are set to 82.4% of the available processor resources, with a timeout of 850 milliseconds. Accordingly, during execution, the processing module 206 will operate in a multi-tasking mode assigning 17.6% of its processing resources to the first decoding thread and 85% of its processing resources to the second decoding thread.

In the exemplary embodiment, the first decoding engine will attempt to decode the current image from the image buffer transferred into memory at step 360, until either it completes the decode attempt, or until the 85 millisecond timeout elapses, and proceed to step 390. If the decode attempt is not successful, the first thread processing jumps back to step 360 to transfer the current image from the image buffer, and attempt a subsequent decode. Concurrently, the processing of the second decoding thread will be performed. In the second decoding thread, the second decoding engine will attempt to decode the current image from the image buffer transferred into memory at step 460, until either it completes the decode attempt, or until the 850 millisecond timeout elapses, and proceed to step 490. If the decode attempt is not successful, the second thread jumps back to step 460 to transfer the current image from the image buffer, and attempt a subsequent decode. The first and second decoding threads will continue to run asynchronously in parallel until either one reports a result, or until the process is otherwise terminated (for example, if the trigger is released).

The net result is that while the total time to decode any one of the first or the second decoding threads in this multi-tasking mode is greater than the same thread having all processing resources dedicated to the task, the perceived response time will be improved over a sequential application of both decoding engines.

In an alternate embodiment, the reader is configured for decoding a two dimensional symbol, such as the data matrix, in the first decoding thread, and a two dimensional symbol, such as PDF417, in the second decoding thread. In yet another alternate embodiment, the reader is configured for decoding the same symbol type in both the first decoding thread and the second decoding thread, where one of the two decoding threads is adapted for more difficult reading applications, such as for DPM applications. In this embodiment, one skilled in the art will appreciate that the robust decoding algorithms will require a greater share of the processor resources to perform its decoding attempt, though the less-robust algorithm may yield a successful decode quickly if the acquired image provides sufficient contrast of features to run successfully.

Other modifications and implementations will occur to those skilled in the art without departing from the spirit and the scope of the invention as claimed. Accordingly, the above description is not intended to limit the invention except as indicated in the following claims.

What is claimed is:

1. A symbology reader comprising:
    an imaging module having an image sensor and a lens to cooperatively provide an image of a field of view;
    a data bus coupled to the imaging module;
    a memory module coupled to the data bus; and
    a processor coupled to the data bus, the processor comprising;
    an acquisition process that controls the imaging module and the memory module to transfer the image into the memory module via the data bus;
    a first decoding thread process that attempts to decode a first symbol type of the image of the field of view;
    a second decoding thread process that attempts to decode a second symbol type of the image of the field of view; and
    wherein the first decoding thread process and the second decoding thread process execute substantially simultaneously.
2. The symbology reader of claim 1 wherein the imaging module, data bus, memory module, and processor are contained within a housing adapted for use as a hand-held reader.
3. The symbology reader of claim 2 further comprising a trigger cooperative with the processor and adapted to initiate the acquisition process, first decoding thread process, and second decoding thread process when the trigger is actuated by a user.
4. The symbology reader of claim 1 wherein the imaging module, data bus, memory module, and processor are contained within a housing adapted for use as a fixed-mount reader.
5. The symbology reader of claim 1 wherein the processor further comprises at least one additional decoding thread process that attempts to decode at least one additional symbol type of the image of the field of view, and wherein each of the first decoding thread process, second decoding thread process, and the at least one additional decoding thread process execute substantially simultaneously.
6. The symbology reader of claim 1 further comprising a communications module adapted to transfer a result of any of the first and second decoding thread process to a host computer.
7. The symbology reader of claim 6 wherein the communications module uses a protocol selected from a list consisting of USB, RS-232, and 802.11 wireless.
8. The symbol reader of claim 1 wherein any of the first decoding thread process and second decoding thread process that is rendered unsuccessful when the elapsed time exceeds an associated timeout variable repeats the decode attempt asynchronously and substantially simultaneously to the respective other of the first decoding thread process and the second decoding thread process using another of the acquired images of the field of view.
9. The symbol reader of claim 8 wherein each time a decoding thread process is used to attempt to decode an image, the image used is a most recently acquired image.
10. The symbol reader of claim 9 wherein the elapsed time is reset for a decoding thread when an attempt to decode a most recently acquired image commences.
11. The symbol reader of claim 1 wherein each time a decoding thread process commences the decoding thread process attempts to decode the encoded symbol in the most recently acquired image of the field of view.
12. The symbol reader of claim 1 wherein first and second apportioning variables are assigned to first and second decoding threads, respectively, where the apportioning variables distribute processing resources unevenly between the first and second decoding threads.
13. The reader of claim 1 wherein the first and second decoding thread processes are executed during small time slices in an interleaved fashion.
14. A method for reading an encoded symbol comprising:
    acquiring image of a field of view;
    attempting to decode an encoded symbol from the acquired image using a first decoding thread while asynchronously and substantially simultaneously attempting to decode the encoded symbol from the image using a second decoding thread; and
    reporting a result when one of the first decoding thread and the second decoding thread is successful.
15. The method of claim 14 wherein the step of acquiring an image further comprises continuously acquiring a plurality of images and wherein at least one of the images includes the encoded symbol.
16. The method of claim 15 wherein each of the first decoding thread and the second decoding thread has a timeout variable that renders the respective decoding thread unsuccessful if an elapsed time exceeds the timeout variable.
17. The method of claim 16 wherein any of the first decoding thread and second decoding thread that is rendered unsuccessful by the timeout variable repeats the acquiring step and the decode attempt step asynchronously and substantially simultaneously to the respective other of the first decoding thread and the second decoding thread.

18. The method of claim 16 wherein the at least one acquired image is a first image, first and second different timeout variables are associated with the first and second decoding threads, respectively, the method further including the step of, when one of the first and second decoding threads is unsuccessful prior to the timeout variable associated with the other of the first and second decoding threads elapsing, attempting to decode an encoded symbol in a second image of the field of view that is different than the first image using the unsuccessful decoding thread.

19. The method of claim 18 wherein the second image is the most recently obtained image of the field of view.

20. The method of claim 14 wherein the first decoding thread is intended for a one-dimensional bar code symbol, and the second decoding thread is intended for a two-dimensional symbol.

21. The method of claim 14 wherein the first decoding thread is intended for a two-dimensional code of a first type, and the second decoding thread is intended for a two-dimensional code of a second type.

22. The method of claim 14 wherein the first decoding thread and the second decoding thread are intended for a similar symbol type.

23. The method of claim 14 wherein the first and second decoding thread processes are executed during small time slices in an interleaved fashion.

24. A method for reading an encoded symbol comprising:
assigning first and second timeout variables to first and second decoding threads, respectively, where the first and second timeout variables are different and the first and second decoding threads are unsuccessful if an elapsed time exceeds the first and second timeout variables, respectively;
acquiring at least one image of the encoded symbol;
attempting to decode the encoded symbol from the at least one image using the first decoding thread while substantially simultaneously and asynchronously attempting to decode the encoded symbol from the at least one image using the second decoding thread; and
reporting a result when one of the first decoding thread and the second decoding thread is successful.

25. The method of claim 24 wherein the step of attempting to decode the encoded symbol is repeated by any one of the first and second decoding threads asynchronously and substantially simultaneously with the other respective one of the decoding threads using another of the plurality of images.

26. The method of claim 25 wherein two of the plurality of decoding threads are intended for a similar symbol type.

27. The method of claim 24 wherein the first decoding thread is intended for a two-dimensional code of a first type, and the second decoding threads is intended for a two-dimensional code of a second type.

28. The method of claim 24 wherein the at least one image is a first image, the first time out period is shorter than the second time out period and, when the elapsed time exceeds the first time out period, the step of attempting to decode the encoded symbol using the first decoding thread is repeated asynchronously and substantially simultaneously with the second decoding threads using a second images that is different than the first image.

29. The method of claim 28 wherein the first decoding thread is intended for a two-dimensional code of a first type, and second decoding thread is intended for a two-dimensional code of a second type.

30. A method for reading an encoded symbol comprising:
assigning first and second apportioning variables to first and second decoding threads, respectively, where the apportioning variables distribute processing resources unevenly between the first and second decoding threads;
assigning first and second different timeout variables to first and second decoding threads, respectively, wherein the first decoding thread is unsuccessful when an elapsed time exceeds the first timeout variable and the second decoding thread is unsuccessful when an elapsed time exceeds the second timeout variable;
continuously acquiring images of a field of view;
attempting to decode an encoded symbol from at least one of the acquired images using the first decoding thread while asynchronously and substantially simultaneously attempting to decode the encoded symbol from at least one of the acquired images using a second decoding thread;
when the attempt to decode using the first decoding thread is unsuccessful while the attempt to decode the encoded symbol using the second decoding thread continues, repeating the attempting to decode step using the first decoding thread for another of the acquired images during another period corresponding to the first timeout variable; and
when the attempt to decode using the second decoding thread is unsuccessful while the attempt to decode the encoded symbol using the first decoding thread continues, repeating the attempting to decode step using the second decoding thread for another of the acquired images during another period corresponding to the second timeout variable.

31. The method of claim 30 wherein, each time an attempting step is repeated, the step is repeated using a most recently acquired image of the field of view.

32. A symbology reader comprising:
an imaging module having an image sensor and a lens to cooperatively provide
a series of images of a field of view;
a data bus coupled to the imaging module;
a memory module coupled to the data bus; and
a processor coupled to the data bus, the processor comprising;
an acquisition process that controls the imaging module and the memory module to transfer the series of images into the memory module via the data bus;
a first decoding thread process that attempts to decode a first symbol type of at least one of the images of the field of view;
a second decoding thread process that attempts to decode a second symbol type of at least one of the images of the field of view; and
wherein first and second timeout variables are assigned to the first and second decoding threads, respectively, where, the first and second timeout variables are different and the first and second decoding threads are unsuccessful if an elapsed time exceeds the first and second timeout variables, respectively;
wherein the first decoding thread process and the second decoding thread process execute substantially simultaneously.

33. A method for reading an encoded symbol comprising:
assigning first and second apportioning variables to first and second decoding threads, respectively, where the apportioning variables distribute processing resources unevenly between the first and second decoding threads;
acquiring at least one image of a field of view;

attempting to decode an encoded symbol from the at least one image using the first decoding thread while asynchronously and substantially simultaneously attempting to decode the encoded symbol from the at least one image using a second decoding thread; and reporting a result when one of the first decoding thread and the second decoding thread is successful.

34. A symbology reader comprising:

an imaging module having an image sensor for generating images of a field of view;

a data bus coupled to the imaging module;

a memory module coupled to the data bus; and at least one processor coupled to the data bus, the at least one processor running at least one program to perform the following processes;

an acquisition process that controls the imaging module and the memory module to transfer the images into the memory module via the data bus;

a first decoding thread process that attempts to decode a first symbol type in at least one of the generated images;

a second decoding thread process that attempts to decode a second symbol type in at least one of the generated images; and wherein the first decoding thread process and the second decoding thread process execute substantially simultaneously.

35. The symbology reader of claim 34 wherein the processor further comprises at least one additional decoding thread process that attempts to decode at least one additional symbol type of the image of the field of view, and wherein each of the first decoding thread process, second decoding thread process, and the at least one additional decoding thread process execute substantially simultaneously.

36. A method for reading an encoded symbol comprising:

using a single imaging module to acquire images of a field of view;

attempting to decode an encoded symbol in at least one of the acquired images using a first decoding thread while asynchronously and substantially simultaneously attempting to decode an encoded symbol in at least one of the images using a second decoding thread; and reporting a result when one of the first decoding thread and the second decoding thread is successful.

37. The method of claim 36 wherein the first decoding thread is intended for a one-dimensional bar code symbol, and the second decoding thread is intended for a two-dimensional symbol.

* * * * *